US009631129B2

(12) United States Patent
Thomas et al.

(10) Patent No.: US 9,631,129 B2
(45) Date of Patent: *Apr. 25, 2017

(54) FLUORINATED ALKENE REFRIGERANT COMPOSITIONS

(75) Inventors: Raymond H. Thomas, Pendelton, NY (US); Rajiv R. Singh, Getzville, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/385,259

(22) Filed: Mar. 20, 2006

(65) Prior Publication Data
US 2007/0069175 A1  Mar. 29, 2007

Related U.S. Application Data

(63) Continuation of application No. 10/695,212, filed on Oct. 27, 2003, now abandoned.

(60) Provisional application No. 60/421,263, filed on Oct. 25, 2002, provisional application No. 60/421,435, filed on Oct. 25, 2002.

(51) Int. Cl.
| C09K 5/04 | (2006.01) |
| C10M 111/02 | (2006.01) |
| C10M 111/04 | (2006.01) |
| C10M 171/00 | (2006.01) |

(52) U.S. Cl.
CPC ........... *C09K 5/045* (2013.01); *C10M 111/02* (2013.01); *C10M 111/04* (2013.01); *C10M 171/008* (2013.01); *C09K 2205/126* (2013.01); *C10M 2207/2835* (2013.01); *C10M 2207/2895* (2013.01); *C10M 2209/1033* (2013.01); *C10M 2209/1095* (2013.01); *C10M 2211/0225* (2013.01); *C10M 2211/063* (2013.01)

(58) Field of Classification Search
CPC . C09K 5/045; C09K 2205/126; C10M 105/32
See application file for complete search history.

(56) References Cited

U.S. PATENT DOCUMENTS

| 2,846,458 A | 8/1958 | Haluska |
| 2,834,748 A | 10/1958 | Bailey et al. |
| 2,889,379 A | 6/1959 | Ruh et al. |
| 2,917,480 A | 12/1959 | Bailey et al. |
| 2,931,840 A | 4/1960 | Maley |
| 2,970,988 A | 2/1961 | Lo |
| 2,996,555 A | 8/1961 | Rausch |
| 3,085,065 A | 4/1963 | Kvalnes |
| 3,085,918 A | 4/1963 | Sherliker et al. |
| 3,472,826 A | 10/1969 | Potts et al. |
| 3,659,023 A | 4/1972 | Regan |
| 3,723,318 A | 3/1973 | Butler et al. |
| 3,384,828 A | 5/1975 | Butler |
| 3,884,828 A | 5/1975 | Butler et al. |
| 4,465,786 A | 8/1984 | Zimmer et al. |
| 4,650,914 A | 3/1987 | Woodard et al. |
| 4,755,316 A | 7/1988 | Magid et al. |
| 4,788,352 A | 11/1988 | Smutny |
| 4,798,818 A | 1/1989 | Baizer et al. |
| 4,900,874 A | 2/1990 | Ihara et al. |
| 4,944,890 A | 7/1990 | Deeb et al. |
| 4,945,119 A | 7/1990 | Smits et al. |
| 4,971,712 A | 11/1990 | Gorski et al. .................. 252/52 |
| 4,975,212 A | 12/1990 | Thomas et al. |
| 5,008,028 A | 4/1991 | Jolley et al. |
| 5,155,082 A | 10/1992 | Tung et al. |
| 5,182,040 A | 1/1993 | Bartlett et al. |
| 5,250,208 A | 10/1993 | Merchant et al. |
| 5,254,280 A * | 10/1993 | Thomas et al. ............... 252/68 |
| 5,370,812 A * | 12/1994 | Brown ........................ 252/68 |
| 5,532,419 A | 7/1996 | Van Der Puy et al. |
| 5,545,777 A | 8/1996 | Morikawa et al. |
| 5,574,192 A | 11/1996 | Van Der Puy et al. |
| 5,578,137 A | 11/1996 | Shealy et al. |
| 5,611,210 A | 3/1997 | Nimitz et al. |
| 5,616,275 A | 4/1997 | Chisholm et al. |

(Continued)

FOREIGN PATENT DOCUMENTS

| EP | GB 950 876 | 2/1964 |
| EP | 0398147 | 11/1990 |

(Continued)

OTHER PUBLICATIONS

U.S. Appl. No. 10/694,273, filed Oct. 27, 2003, Singh et al.
U.S. Appl. No. 10/695,212, filed Oct. 27, 2003, Thomas et al.
U.S. Appl. No. 10/826,811, filed Apr. 16, 2004, Singh et al.
U.S. Appl. No. 10/826,592, filed Apr. 16, 2004, Singh et al.
U.S. Appl. No. 10/826,072, filed Apr. 16, 2004, Singh et al.
U.S. Appl. No. 10/837,525, filed Apr. 29, 2004, Singh et al.

(Continued)

*Primary Examiner* — John Hardee
(74) *Attorney, Agent, or Firm* — Colleen D. Szuch

(57) ABSTRACT

Liquid compositions for use in compression refrigeration, air-conditioning and heat pump systems in which a fluoroalkene containing from 3 to 4 carbon atoms and at least 1 but no more than 2 double bonds is combined with an effective amount to provide lubrication of an essentially miscible organic lubricant comprised of carbon, hydrogen and oxygen and having a ratio of oxygen to carbon effective to provide a degree of miscibility with said fluoroalkene so that when up to five weight percent of lubricant is added to said fluoroalkene the refrigerant has one liquid phase at at least one temperature between −40 and +70° C. Methods for producing refrigeration and heating with the fluoroalkenes, alone or in combination with the disclosed lubricants, are also disclosed.

16 Claims, No Drawings

(56) References Cited

U.S. PATENT DOCUMENTS

| | | | |
|---|---|---|---|
| 5,648,017 A | 7/1997 | Bartlett et al. | |
| 5,674,451 A | 10/1997 | Nimitz et al. | |
| 5,679,875 A | 10/1997 | Aoyama et al. | |
| 5,710,352 A | 1/1998 | Tung | |
| 5,714,083 A | 2/1998 | Turner et al. | |
| 5,728,904 A | 3/1998 | Van Der Puy et al. | |
| 5,736,062 A | 4/1998 | Basile | |
| 5,736,063 A | 4/1998 | Richard et al. | |
| 5,744,052 A | 4/1998 | Bivens | |
| 5,763,063 A | 6/1998 | Pass et al. | |
| 5,788,886 A | 8/1998 | Minor et al. | |
| 5,792,383 A | 8/1998 | Reyes-Gavilan et al. | 252/68 |
| 5,800,730 A | 9/1998 | Bivens et al. | |
| 5,811,603 A | 9/1998 | Elsheikh | |
| 5,866,030 A | 2/1999 | Reyes-Gavilan et al. | |
| 5,969,198 A | 10/1999 | Thenappan et al. | |
| 5,986,151 A | 11/1999 | Van Der Puy et al. | |
| 6,023,004 A | 2/2000 | Thenappan et al. | |
| 6,025,532 A | 2/2000 | Sage | |
| 6,031,141 A | 2/2000 | Mallikarjuna et al. | |
| 6,041,621 A | 3/2000 | Oslzewski et al. | |
| 6,045,444 A | 4/2000 | Zima et al. | |
| 6,059,027 A | 5/2000 | Lake et al. | |
| 6,076,372 A * | 6/2000 | Acharya et al. | 62/606 |
| 6,089,032 A | 7/2000 | Tractenberg | |
| 6,111,150 A | 8/2000 | Sakyu et al. | |
| 6,124,510 A | 9/2000 | Elsheikh et al. | |
| 6,173,902 B1 | 1/2001 | Bauer et al. | |
| 6,176,102 B1 | 1/2001 | Novak et al. | |
| 6,235,951 B1 | 5/2001 | Sakyu et al. | |
| 6,258,292 B1 | 7/2001 | Turner | |
| 6,274,779 B1 | 8/2001 | Merkel et al. | |
| 6,300,378 B1 | 10/2001 | Tapscott | |
| 6,304,803 B1 | 10/2001 | Dao | |
| 6,316,681 B1 | 11/2001 | Yoshikawa et al. | |
| 6,327,866 B1 | 12/2001 | Novak et al. | |
| 6,369,284 B1 | 4/2002 | Nappa et al. | |
| 6,374,629 B1 | 4/2002 | Oberle et al. | |
| 6,382,305 B1 | 5/2002 | Sano | |
| 6,516,837 B2 | 2/2003 | Thomas et al. | |
| 6,530,421 B1 | 3/2003 | Filius et al. | |
| 6,548,719 B1 | 4/2003 | Nair et al. | |
| 6,589,355 B1 | 7/2003 | Thomas et al. | |
| 6,640,841 B2 | 11/2003 | Thomas | |
| 6,695,973 B1 | 2/2004 | Musso | |
| 6,783,691 B1 | 8/2004 | Bivens | |
| 6,809,226 B1 | 10/2004 | Pennetreau et al. | |
| 6,843,930 B2 | 1/2005 | Cho | |
| 6,858,571 B2 * | 2/2005 | Pham et al. | 510/408 |
| 6,958,424 B1 | 10/2005 | Nair et al. | |
| 6,969,701 B2 * | 11/2005 | Singh et al. | 510/412 |
| 6,972,271 B2 | 12/2005 | Thomas et al. | |
| 6,991,532 B2 | 1/2006 | Goldsmith | |
| 6,991,744 B2 | 1/2006 | Mahler | |
| 7,074,751 B2 * | 7/2006 | Singh et al. | 510/408 |
| 7,098,176 B2 * | 8/2006 | Singh et al. | 510/408 |
| 7,105,152 B1 | 9/2006 | Schultz | |
| 7,230,146 B2 | 6/2007 | Merkel et al. | |
| 7,279,451 B2 | 10/2007 | Singh et al. | |
| 7,341,984 B2 * | 3/2008 | Wilson et al. | 510/408 |
| 7,345,209 B2 | 3/2008 | Mukhopadhyay et al. | |
| 7,534,366 B2 * | 5/2009 | Singh et al. | 252/68 |
| 7,563,384 B2 * | 7/2009 | Thomas et al. | 252/67 |
| 7,605,117 B2 * | 10/2009 | Wilson et al. | 510/408 |
| 7,622,435 B2 * | 11/2009 | Wilson et al. | 510/408 |
| 7,825,081 B2 * | 11/2010 | Singh et al. | 510/408 |
| 8,008,244 B2 * | 8/2011 | Knopeck et al. | 510/408 |
| 8,741,829 B2 * | 6/2014 | Singh | C09K 3/30 252/67 |
| 2003/0127115 A1 | 7/2003 | Thomas et al. | |
| 2004/0119047 A1 | 6/2004 | Singh et al. | |
| 2004/0127383 A1 | 7/2004 | Pham et al. | |
| 2004/0256594 A1 | 12/2004 | Singh et al. | |
| 2005/0020862 A1 | 1/2005 | Tung et al. | |
| 2005/0054741 A1 | 3/2005 | Zipfel et al. | |
| 2005/0090698 A1 | 4/2005 | Merkel et al. | |
| 2005/0107246 A1 | 5/2005 | Thomas et al. | |
| 2005/0171391 A1 | 8/2005 | Janssens et al. | |
| 2006/0243944 A1 | 11/2006 | Minor et al. | |
| 2007/0098646 A1 | 5/2007 | Nappa et al. | |
| 2007/0100010 A1 | 5/2007 | Creazzo et al. | |
| 2007/0108403 A1 | 5/2007 | Sievert et al. | |
| 2007/0284555 A1 | 12/2007 | Leck et al. | |

FOREIGN PATENT DOCUMENTS

| | | |
|---|---|---|
| EP | 0522639 | 1/1993 |
| EP | 0644173 | 5/1993 |
| EP | 0 681 933 A1 | 11/1995 |
| EP | 0974571 | 1/2000 |
| EP | 1055439 | 11/2000 |
| EP | 1191080 | 7/2002 |
| EP | 0971571 | 4/2003 |
| EP | 0974571 | 4/2003 |
| JP | 63-211245 | 9/1988 |
| JP | 63-303950 | 12/1988 |
| JP | 4-110388 | * 4/1992 |
| JP | 04-110388 A | 4/1992 |
| JP | 8-157847 A | 6/1996 |
| JP | 10007604 | 10/1998 |
| JP | 11140002 | 5/1999 |
| JP | 2000169404 | 6/2000 |
| RU | 2073058 C1 | 12/1994 |
| WO | WO 93/24588 | * 12/1993 |
| WO | WO 95/04021 | 2/1995 |
| WO | WO 96/01797 | 1/1996 |
| WO | WO 98/33755 | 8/1998 |
| WO | WO 03064508 | 8/2003 |
| WO | WO2004/037752 | 5/2004 |
| WO | WO 2004/37752 A2 | 5/2004 |
| WO | WO 2004/037913 | 5/2004 |
| WO | WO 2005/012212 | 2/2005 |
| WO | WO 2005/042451 | 5/2005 |
| WO | WO 2005/042663 | 5/2005 |
| WO | WO 2005/103187 | 11/2005 |
| WO | WO 2005/103188 | 11/2005 |
| WO | WO 2005/103190 | 11/2005 |
| WO | WO 2005/103191 | 11/2005 |
| WO | WO 2005/103192 | 11/2005 |
| WO | WO 2005/105947 | 11/2005 |
| WO | 2007002625 | 1/2007 |

OTHER PUBLICATIONS

Billy C. Langley, "Automotive Air Conditioning," *Refrigeration and Air Conditioning*, 3d Ed. Prentice-Hall, (1986) pp. 525-526 US.

Althouse, et al., "Heat Pump Systems, Principles, Applications," *Modern Refrigeration and Air Conditioning*, Chapter 26, pp. 999, 1002-1003. The Goodheart-Wilcox Co., Inc. (1968) US.

Meyer Kutz (Editor), "Refrigerants," *Mechanical Engineers' Handbook*, 2d Ed., p. 1887, John Wiley & Sons, Inc. (publ.) (1998) US.

Althouse et al., "Automobile Air Conditioning," *Modern Refrigeration and Air Conditioning*, Chapter 27, pp. 949-976. The Goodheart-Wilcox Co., Inc. (1988) US.

H. Michael Hughes, "Refrigerants," *Refrigeration Systems for HVAC*, Section 6, pp. 6.1.2-6.1.15, McGraw-Hill Co. (1997) US.

Society of Heating, Air-Conditioning and Sanitary Engineers, "Chapter 1. Refrigeration System and Heat Pump Overview," *Air Conditioning and Sanitary Engineering Handbook*, 12th Ed. (Mar. 25, 1995) JP.

Sybil Parker (Ed.), *McGraw-Hill Encyclopedia of Engineering*, 2d Ed. (1993), p. 525 (Heat Pump). US.

M Spatz et al., "HFO-1234yf Low GWP Refrigerant," Presentation given at *SAE 2008 Alternate Refrigerant Systems Symposium*, Scottsdale (AZ), 10-12.06.2008. US.

M Spatz et al., "HFO-1234yf Low GWP Refrigerant," Presentation given at International Refrigeration and Air Conditioning Conference at Purdue, 14-17.07.2008 US.

LJM Kuipers, "Impact of the decrease in CFC Emissions on refrigeration: target of the IIR initiative," *Int. J. Refrigeration*, pp. 35-51, vol. 11, No. 6. (1988) US.

(56) References Cited

OTHER PUBLICATIONS

Directive 2006/40/EC of the European Parliament and of the Council of May 17, 2006 relating to emissions from air-conditioning systems in motor vehicles and amending Council Directive 70/156/EC. May 17, 2006 EU.
European Parliament Session Document. "Report on the Proposal for a European Parliament and Council Regulation on Certain Fluorinated Greenhouse Gases." (COM(2003)492-C5-0397/03-2003/0189(COD)), Mar. 18, 2004.
J Jones, CJ Morrissey, Nearly Azeotropic mixtures to replace refrigerant 12, *NASA Tech Brief*, vol. 16, No. 8, Item #122 from JPL New Technology Report NPO 18030//528, pp. 1-39, Aug. 1992 US.
"Compatibility With Refrigeration Oil," Extract from the *Daikin Handbook*, Jun. 2001, pp. 25-28.
Sjoholm et al., "Twin-Screw Compressor Performance and Suitable Lubricants With HFC-134a," International Compressor Engineering Conference at Purdue (17-20.07.1990), Proceedings vol. II, pp. 733-740. US.
Honeywell's submission to EPO dated May 2, 2009 together with documents cited and referred to therein. EP (documents submitted herein are below (16a-16k).
Althouse et al., "Basic Air Conditioning Systems," *Modern Refrigeration and Air Conditioning*, Chapter 19, pp. 679-705. The Goodheart-Wilcox Co., Inc. (pub.) (1988) US.
Billy C. Langley, "Automotive Air Conditioning," *Refrigeration and Air Conditioning*, 3d Ed. Prentice-Hall, (1986) Chapter 21, pp. 525-553 US.
European Parliament, "Report on the proposal for a European Parliament and Council regulation on certain fluorinated greenhouse gases," (COM(2003)492-C5-0397/03-2003/0189(COD)) Mar. 18, 2004 (EP).
Pollution Prevention Fact Sheet No. 10, Pollution Prevention Program. Federal Programs Division, Managing Controlled Refrigerants, Jan. 1997, pp. 1-8 CA.
Graham, "Global Market for Heating, Ventilation and Air-Conditioning Systems," About Automotive—Research Report, 2006 Edition. GB.
Ignatio De Alvaro et al., "Market Report, Minisplits," BSRIA Report No. 18588/5, May 2004.
Emil Milker et al., "Worldwide Air Conditioning," BSRIA Report No. 19947B, BSRIA Limited, Mar. 2008, GB.
National Technical Information Service, U.S. Dept. of Commerce, Support: Letter from DuPont Haskell Lab to USEPA Regarding Results of Bacterial Reverse Mutation Assay Conducted With 1-Propene, 1,1,3,3,3-Pentafluoro-. Apr. 17, 2000.
Morrissey, C.J., "Nearly Azeotropic Mixtures to Replace Refrigerant 12," From National Aeronautics and Space Administration Contract No. NAS 7-918, Aug. 1992, NASA Tech Brief, vol. 16, No. 8, Item #122. US.
1234yf OEM Group, "Update: 1234yf as a replacement for R134a," published following MAC (Mobile Air-Conditioning) Summit in 2008, see pp. 14, 15 and 18.
PRNewswire, Honeywell's Low-Global-Warming-Potential Refrigerant Endorsed by SAE International Cooperative Research Project, internet article, www.prnewswire.co.uk/cgi/news/release?id=24472 (Dec. 8, 2008) GB.
Takahashi, "Alternative Technologies for Refrigeration and Air-Conditioning Applications," *Environmental Chemistry of Chlorofluorocarbon and Control Engineering*, (Quarterly Issue of General Review of Chemistry, 1991, No. 11) JP.
Kenji Tojo, "Insulations Systems and Materials for Hermetic Motor," *Latest new refrigerant insulation system technology*, Chapter 7, First Edition, (1996) JP.
Honeywell International Inc. Response to Notice of Opposition of Arkema France and exhibits cited therein. EP Dec. 20, 2010.
Althouse et al., "Basic Air Conditioning Systems," *Modern Refrigeration and Air Conditioning*, Chapter 19, pp. 679-705. The Goodheart-Wilcox Co., Inc. (pub.) (1988) US (previously cited).
Graham, "Global Market for Heating, Ventilation and Air-Conditioning Systems," About Automotive—Research Report, 2006 Edition. GB (previously cited).
Ignatio De Alvaro et al., "Market Report, Minisplits," BSRIA Report No. 18588/5, May 2004. (previously cited).
Milker, et al., "Report, Worldwide Air Conditioning," BSRIA, Report No. 19947B, Mar. 2008. GB.
Pollution Prevention Fact Sheet No. 10, Pollution Prevention Program. Federal Programs Division, Managing Controlled Refrigerants, Jan. 1997, pp. 1-8 CA (previously cited).
About MACS Worldwide, "Welcome to the Mobile Air Conditioning Society (MACS) Worldwide", webpage printout http://www.macsw.org//AM/Template.cfm?Section=Home Dec. 15, 2010.
Billy C. Langley, "Automotive Air Conditioning," *Refrigeration and Air Conditioning*, 3d Ed. Prentice-Hall, (1986) Chapter 21, pp. 525-553 US (previously cited).
U.S. Pat. No. 3,607,755 (Murphy et al.), Issued Sep. 21, 1971.
H. Kruse, "CFC Research Programmes in Western Europe," Int. J. Refrig. 1990, vol. 13 (Presented at the 1989 ASHRAE CFC Technology Conference, Gaithersburg, MD (Sep. 27-28, 1989). US.
Bivens et al., "Fluoroethers and Other Next-Generation Fluids," ASHRAE/NIST Refrigerants Conference—Oct. 1997.
Smith, New Chemical Alternatives for CFCs and HCFCs, U.S. Environmental Protection Agency, EPA-600/F-92-012 (Mar. 24, 1992) US.
J. Calm and D. Didion et al., "Trade-Offs in Refrigerant Selections: Past, Present, and Future," ASHRAE/NIST Refrigerant Conference—Oct. 1977.
Denis Clodic, "Automobile Air Conditioning: Environmental Issues and Future Technical Alternatives," The globalization of automobile air conditioning. General review of refrigeration and air conditioning, May 2008 (translation).
R. Gicquel, "Thermodynamic Diagrams—Mixtures Used in Refrigeration." Apr. 1, 2003. FR.
Weiss et al., "Current and Projected use of Refrigerants in Europe," ASHRAE/NIST Refrigerants Conference—Oct. 1997.
2006 Standard for Sepcifications for Fluorocarbon Refrigerants, Standard 700—ARI (Air-Conditioning & Refrigerant Institute), copyright 2006.
J Jones, CJ Morrissey, Nearly Azeotropic mixtures to replace refrigerant 12, *NASA Tech Brief*, vol. 16, No. 8, Item #122 from JPL New Technology Report NPO 18030//528, pp. 1-39, Aug. 1992 US (previously cited).
Kopko, "Beyond CFCs: Extending the Search for New Refrigerants," Supplied by the British Library. Mar. 1990.
1234yf OEM Group, "Update: 1234yf as a replacement for R134a," published following MAC (Mobile Air-Conditioning) Summit in 2008, see pp. 14, 15 and 18. (previously cited).
PRNewswire, Honeywell's Low-Global-Warming-Potential Refrigerant Endorsed by SAE International Cooperative Research Project, internet article, www.prnewswire.co.uk/cgi/news/release?id=24472 (Dec. 8, 2008) GB (previously cited).
Clodic, Automobile Air Conditioning: Environmental Issues and Future Technical Alternatives, The New Refrigerant Fluids. (translation) (May 2008) FR.
"Arkema Beefs Up Chemicals; Eyes Acquisition of Acrylics Assets," Business & Finance News, Chemical Week, Nov. 17, 2008, p. 19.
Executed Assignment of Inventorship for U.S. Application, Honeywell Reference H0003965CIP. Recorded Dec. 17, 2005 Reel/Frame 017099/0215 . US.
Exeduted Declaration of Inventorship for U.S. Appl. No. 10/837,525, Honeywell Reference H0003965CIP. Filed Aug. 19, 2004. US.
U.S. Pat. No. 7,279,451 (previously cited). Issued Oct. 9, 2007. US.
National Technical Information Service, U.S. Dept. of Commerce, Support: Letter from DuPont Haskell Lab to USEPA Regarding Results of Bacterial Reverse Mutation Assay Conducted With 1-Propene, 1,1,3,3,3-Pentafluoro-. Apr. 17, 2000 (previously cited).
Althouse et al., "Automobile Air Conditioning," *Modern Refrigeration and Air Conditioning*, Chapter 27, , pp. 949-976. The Goodheart-Wilcox Co., Inc. (1988) US (previously cited).

(56) References Cited

OTHER PUBLICATIONS

Honeywell webpage printout, re: Honeywell Genetron Refrigerants, "Commercial AC Products," (Jul. 14, 2010) US.
Honeywell webpage printout, re: Honeywell Genetron Refrigerants, "Mobile A.C," (Jul. 14, 2010) US.
Honeywell webpage printout, re: Honeywell Genetron Refrigerants, "Genetron 134a," (Jul. 14, 2010) US.
OJ Nielsen et al., "Atmospheric chemistry of $CF_3CF=CH_2$: Kinetics and mechanisms of gas-phase reactions with CI atoms, OH radicals, and $O_3$," Science Direct, Chemical Physics Letters 439 (2007) pp. 18-22 (www.sciencedirect.com) US.
ANSI / ASHRAE Standard 34-2007 Designation and Safety Classification of Refrigerants, 2007.
BSR / ASHRAE Addendum z zu ANSI-ASHRAE Standard 34-2007, Public Review Draft, Sep. 2008.
M Spatz et al., "HFO-1234yf Low GWP Refrigerant," Presentation given at SAE 2008 Alternate Refrigerant Systems Symposium, Scottsdale (AZ), (Jun. 10-12, 2008) U.S.
V. I. Orkin et al., Rate Constants for the Reactions of OH with HFC-245cb ($CH_3$ CI Fluoroalkenes ($CH_2$ $CHCF_3$, $CH_2$ $CFCF_3$, $CF_2$ $CFCF_3$ and $CF_2$ $CF_2$, J. Phys Chem. A, vol. 101. pp. 9118-9124 (1997) US.
Wikipedia (the free encyclopedia) entry of Jul. 14, 2010, "HVAC, Background, Ventilating, Air conditioning, Energy Efficiency, HVAC Industry and Standards," http://en.wikipedia.org/wiki/HVAC; and collection of patent applications disclosing HVAC systems in automobiles.
Proposal for the Regulation of the European Parliament and of the Council on certain fluorinated greenhouse gases—Aug. 11, 2003.
Orkin et al., "Photochemistry of Bromine—containing Fluorinated Akenes; Reactivity toward OH and UV Spectra," J. Phys. Chem. A 2002, vol. 106, pp. 10195-10199 US.
Calorex Heat Pumps LTD., "Energy Efficient Hot Water Heating," booklet, 4 pages. Feb. 27, 2009. US.
Mitsubishi Electric, "Water Heating Units," (leaflet), (4 pages) 2009. GB.
IVT Heat Pumps, "Greenline," (leaflet), (2 pages) 2009. SE.
Conergy, "Conergy Heat Pump: The Clever Choice for Hot Water," (leaflet), (2 pages) 2009. AU.
Dimplex, "Hot water heat pump with sheet steel casing, air duct connection and additional heat exchanger," Data Sheet (1 page). 2009. DE.
Honeywell International Inc., "Guide to Alternative Refrigerants," (leaflet), (2 pages). Copyright 2005. US.
M Tekeuchi et al., "An Environmentally Friendly, Highly Efficient, Lightweight Scroll Compressor (QS90) for Car Air Conditioners" Mitsubishi Heavy Industries, Ltd. Technical Review, vol. 45, No. 3, pp. 24-26 (Sep. 2008) US.
New Refrigerant Insulating System Technology, pp. 75-78 (Apr. 15, 1996).
The Properties of Gases and Liquids, Poling et al, 2001, excerpts from chapters 2, 3, 4, 6 and 7.
Discussion on Modelling of Properties. Nov. 2009.
Fundamental Equation of State for 2,3,3,3-Tetrafluoropropene (HFO-1234yf) Ryo Akasaka et al. (HFO-1234yf Property Sheet).
International Symposium on Next Generation Air Conditioning and Refrigeration Technology, Feb. 17-19, 2010, Tokyo, JP.
Opposition 1—Arkema France (translation). Aug. 16, 2010.
Opposition 1—Arkema further opposition documents (translation). Aug. 4, 2010.
Opposition 2—Daikin Industris Ltd (translation). Aug. 4, 2010.
Opposition 3—Asahi Glass Company Ltd. Aug. 5, 2010.
Opposition 4—Daimler AG. Aug. 4, 2010.
Opposition 5—ACEA European Automobile Manufactures Association. Aug. 10, 2010.
Opposition 6—Anonymous. Aug. 11, 2010.
Opposition 7—Bayerische Motoren Werke AG (translation). Aug. 9, 2010.
Opposition 8—Mexichem Amanco Holdings SA. Aug. 16, 2010.
Opposition 9—Solvay Fluor GmbH. Aug. 18, 2010.
Observation 10—Potter Clarkson LLP, Third Party Observations to EP Patent Appl. No. 05744161.0, filed by Inneos Fluor Limited, Feb. 26, 2009. EP.
Observation 11—Anonymous—Filed by Arnason/Faktor, Intellectual Property Consulting, Reykjavik, Iceland, Dec. 9, 2008. IE.
Observation 12—Anonymous—Filed by Dr. Modiano & Associates, Milano, Feb. 26, 2009. IT.
Observation 13—Anonymous—Anonymous—Filed by Dr. Modiano & Associates, Milano, Apr. 2, 2009. IT.
English Translation of Official Action in Connection With Corresponding Japanese Patent Application No. 2004-547148. Sep. 15, 2010.
Response to Japanese office action (not translated) and English language translation of claims as amended. Dec. 2010.
English Translation of JP Anonymous Submission of Prior Art References to Opposition to JP Application No. 2004-547148, dated Jun. 8, 2010.
Notice of Allowance in JP Application No. 2004-547148 (not translated) and allowed claims. Mar. 4, 2011. JP.
Reexamination Request of U.S. Pat. No. 7,279,451. U.S. Appl. No. 95/000,576, filed Oct. 5, 2010.
Reexamination Request of U.S. Pat. No. 7,524,805. U.S. Appl. No. 95/000,574, filed Oct. 5, 2010.
Saunders and Frisch, "Polyurethanes Chemistry & Technology," vol. XVI, Part I and Part II Technology, John Wiley and Sons, New York, NY (1962), pp. 193-201 and 219-223. US.
Downing, Ralph C., "Fluorocarbon Refrigerants Handbook," Prentice Hall, Excepts from Chapter 3 and Chapter 16. Copyright 1988. US.
Haszeldine, R. N. et al., "Free-radical Additions to Unsaturated Systems. Part XVII. Reaction of Trifluoroiodomethane with Mixtures of Ethylene and Vinyl Fluoride and of Ethylene and Propene," J. Chern. Soc., Section C, Organic (3), pp. 414-421 (1970), XP002343900.
Henne et al., "Fluorinated Derivatives of Propane and Propylene VI," J. Am. Chern. Soc., 68, pp. 496-497 (1946).
Kimura, et al., "Poly(ethylene glycols) and poly(ethylene glycol)-grafted copolymers are extraordinary catalysts for dehydrohalogenation under two-phase and three-phase conditions," J. Org. Chern., 48,195-0198 (1983).
Knunyants I. L. et al., "Reactions of Fluoro Olefins Communication 13, Catalytic DJ Hydrogenation of Perfluoro Oletins," Bulletin of the Academy of Sciences of the USSR, pp. 1312-1317 XPOO0578879. Mar. 1959.
Tarrant, et al., "Free Radical Additions Involving Fluorine Compounds. IV. The Addition of Dibromodifluoromethane to Some Fluoro06letins," J. Am. Chern Soc., 77,2783-2786 (1955).
Kunshenko, B. V. et al., "Reaction of Organic Compounds with SF4-HF-Halogenating System VII. Reactions of Oletins with the SF4-HF-CI2(Br2) System," Odessa DM PolytechnicalInstitute, Institute of Organic Chemistry, Academy of Sciences of the Ukraine, Kiev., Translated from Zhuranl Organicheskoi Khimii, 28(4), 672-80 (1982), Original article submitted Aug. 24, 1989. XP002344564.
Database WPI Section Ch, Week 199221 Derwent Publications Ltd., London, GB; Class E16, AN 1992-172539 XP002344657. Published Apr. 10, 1992.
Written Opinion of International Search Authority for PCT/US2005/14874. Oct. 29, 2006. WO.
Albert W. Noyes, Editor, The Journal of the American Chemical Society, vol. LXXVII; Apr.-Jun. 1955 pp. 3149-3151. US.
Jan H. Schutt, Polyurethane Foam Industry Prepares for 'Zero ODP', Plastics Technology—Internet article (http://www.plasticstechnology.com/articles/199911_fa3.html). Nov. 1999.
Perry Romanowski, "Polyurethane, How Plastics Are Made," Gale Edit, Volumes-Polyurethane. Jan. 2006. US.
International Search Report for PCT/US04/35132 (corresponding U.S. Appl. No. 11/385,259). Apr. 27, 2006. WO.
ASHRAE Standard, Sealed Glass Tube Method to Test the Chemical Stability of Materials for Use within Refrigerant Systems, ANSI/ASHRAE Standard 97/2007 (supersedes Standard 97-1999), Jun. 2007 U.S.

(56) References Cited

OTHER PUBLICATIONS

S.C. Zoz and M.B. Pate, "Critical Solution Temperatures for Ten Different Non-CFC Refrigerants with Fourteen Different Lubricants," International Refrigeration and Air Conditioning Conference, Paper 285, pp. 431-436. (1994) U.S.

"AHRI Low-GWP Alternative Refrigerants Evaluation Program," Public Sector Research, Air Conditioning, Heating and Refrigeration Institute (AHRI), 3 pages (Oct. 15, 2012) U.S.

William L. Kopco, "Beyond CFCs: Extending the Search for New Refrigerants," Article in Proceedings of ASHRAE's 1989 CFC Technology Conference, pp. 39-46, National Institute of Standards and Technology, Gaithersburg, MD. Sep. 27-28, 1989 U.S.

McLinden et al., "Quest for Alternatives—A molecular approach demonstrates tradeoffs and limitations are inevitable in seeking refrigerants," ASHRAE Journal, pp. 32-42, Dec. 1987, U.S.

Takizawa et al., "Flammability assessment of $CH_2=CFCF_3$: Comparison with fluoroalkenes and fluoroalkanes," J. Hazardous Materials, vol. 172, pp. 1329-1338 (2009) U.S.

S. Kondo et al., "Flammability limits of olefinic and saturated fluoro-compounds," J. Hazardous Materials, vol. 171, pp. 613-618 (2009) U.S.

* cited by examiner

FLUORINATED ALKENE REFRIGERANT COMPOSITIONS

RELATED APPLICATIONS

The present application is a continuation of application Ser. No. 10/695,212, filed Oct. 27, 2003, now abandoned, which is incorporated herein by reference.

The present application is also related to and claims the priority benefit of U.S. Provisional Application Nos. 60/421,263, and 60/421,435, each of which was filed on Oct. 25, 2002 and each of which is incorporated herein by reference. The present application is also related to and incorporates by reference each of the following filed U.S. Patent Applications: application Ser. No. 10/694,273 entitled "COMPOSITIONS CONTAINING FLUORINE SUBSTITUTED OLEFINS," by Singh et al. and application Ser. No. 10/694,272 entitled "PROCESS FOR PRODUCING FLUOROPROPENES," by Tung et al.

FIELD OF THE INVENTION

The present invention relates to compositions used as refrigeration fluids in compression refrigeration, air-conditioning and heat pump systems.

BACKGROUND OF THE INVENTION

The use of chlorine-containing refrigerants, such as chlorofluorocarbons (CFC's), hydrochlorofluorocarbons (HCF's) and the like, as refrigerants in air-conditioning and refrigeration systems has become disfavored because of the ozone-depleting properties associated with such compounds. As a result, it has become desirable to retrofit chlorine-containing refrigeration systems by replacing chlorine-containing refrigerants with non-chlorine-containing refrigerant compounds that will not deplete the ozone layer, such as hydrofluorocarbons (HFC's).

In order for any of the replacement materials to be useful in connection with refrigeration compositions, the materials must be compatible with the lubricant utilized in the compressor. Unfortunately, many non-chlorine-containing refrigeration fluids, including HFC's, are relatively insoluble and/or immiscible in the types of lubricants used traditionally with CFC's and HFC's, including, for example, mineral oils, alkylbenzenes or poly(alpha-olefins). In order for a refrigeration fluid-lubricant combination to work efficiently within a compression refrigeration, air-conditioning or heat pump system, the lubricant must be sufficiently soluble in the refrigeration liquid over a wide range of operating temperatures. Such solubility lowers the viscosity of the lubricant and allows it to flow more easily throughout the system. In the absence of such solubility, lubricants tend to become lodged in the coils of the compression refrigeration, air-conditioning or heat pump system evaporator, as well as other parts of the system, and thus reduce the system efficiency.

Polyalkylene glycol, esterified polyalkylene glycol, and polyol ester lubricating oils have been developed as misicible lubricants for HFC refrigeration liquids. Polyalkylene glycol refrigeration lubricants are disclosed by U.S. Pat. Nos. 4,755,316; 4,971,712, and 4,975,212. Polyalkylene glycol esters are disclosed by U.S. Pat. No. 5,008,028. The polyalkylene glycol and polyalkylene glycol ester lubricating oils are disclosed as being misicible in fluoroalkanes containing one or two carbon atoms and no double bonds.

Consequently fluorocarbon-based fluids have found widespread use in industry for refrigeration system applications, including air-conditioning systems and heat pump applications as well, all of which involve compression refrigeration. Compression refrigeration generally involves changing the refrigerant from the liquid to the vapor phase through heat adsorption at a lower pressure and then from the vapor to the liquid phase through heat removal at an elevated pressure.

While the primary purpose of refrigeration is to remove energy at low temperature, the primary purpose of a heat pump is to add energy at higher temperature. Heat pumps are considered reverse cycle systems because for heating, the operation of the condenser is interchanged with that of the refrigeration evaporator.

The art is continually seeking new fluorocarbon and hydrofluorocarbon-based pure fluids that offer alternatives for refrigeration and heat pump applications. Applicants have come to appreciate that fluoro-olefin-based materials (fluoroalkenes) are of particular interest because they have characteristics that make them environmentally safer substitutes for the presently used fluoroalkanes (HFC's), that despite being safe for the ozone layer are suspected of causing global warming.

Applicant has also come to recognize that refrigeration composition substitutes for HFC's in many cases preferably possess certain performance properties to be considered acceptable substitutes, including acceptable refrigeration characteristics, chemical stability, low toxicity, non-flammability, lubricant compatibility and efficiency in use. The latter characteristic is important in many refrigeration systems, air-conditioning systems and heat pump applications, especially when a loss in refrigeration thermodynamic performance or energy efficiency may have secondary environmental impacts through increased fossil fuel usage arising from an increased demand for electrical energy. Furthermore, it would be advantageous for HFC refrigeration composition substitutes to not require major engineering changes to conventional vapor compression technology and lubricant systems currently used with HFC refrigeration liquids.

Flammability is another important property for many applications. That is, it is considered either important or essential in many applications, including particularly in heat transfer applications, to use compositions which are non-flammable. Thus, it is frequently beneficial to use in such compositions compounds which are nonflammable. As used herein, the term "nonflammable" refers to compounds or compositions which are determined to be nonflammable in accordance with ASTM standard E-681, dated 2002, which is incorporated herein by reference. Unfortunately, many HFC's which might otherwise be desirable for used in refrigerant compositions are not nonflammable. For example, the fluoroalkane difluoroethane (HFC-152a) and the fluoroalkene 1,1,1-trifluoropropene (HFO-1243zf) are each flammable and therefore not viable for use in many applications.

Higher fluoroalkenes, that is fluorine-substituted alkenes having at least five carbon atoms, have been suggested for use as refrigerants. Smutry, U.S. Pat. No. 4,788,352 is directed to production of fluorinated $C_5$ to $C_8$ compounds having at least some degree of unsaturation. The Smutny patent identifies such higher olefins as being known to have utility as refrigerants, pesticides, dielectric fluids, heat transfer fluids, solvents, and intermediates in various chemical reactions.

While the fluorinated olefins described in Smutny may have some level of effectiveness in heat transfer applications, it is believed that such compounds may also have certain disadvantages. For example, some of these compounds may tend to attack substrates, particularly general-purpose plastics such as acrylic resins and ABS resins. Furthermore, the higher olefinic compounds described in Smutny may also be undesirable in certain applications because of the potential level of toxicity of such compounds which may arise as a result of pesticide activity noted in Smutny. Also, such compounds may have a boiling point which is too high to make them useful as a refrigerant in certain applications.

Applicant have thus come to appreciate a need for compositions, and particularly fluid transfer compositions that are potentially useful in numerous applications, including vapor compression heating and cooling systems and methods, while avoiding one or more of the disadvantages noted above. Moreover, applicant has also recognized that in many applications there remains a need for fluorocarbon and hydrofluorocarbon-based refrigeration liquids that are environmentally safer than HFC's, possess similar or better characteristics with respect to at least certain refrigerant thermodynamic performance properties, and are compatible with existing lubricant systems.

SUMMARY

Applicants have found that the above-noted needs, and other needs, can be satisfied by compositions comprising one or more C3 or C4 fluoroalkenes, preferably compounds having Formula 1 as follows:

$$XCF_zR_{3-z} \qquad (1)$$

where X is a $C_2$ or a $C_3$ unsaturated, substituted or unsubstituted, alkyl radical, R is independently Cl, Br, I or H, and z is 1 to 3. The present compositions also preferably include one or more lubricants in combination with one or more of the compounds of the present invention.

The present invention provides also methods and systems which utilize the heat transfer compositions of the present invention.

DETAILED DESCRIPTION OF PREFERRED EMBODIMENTS

The Compositions

The present invention is directed to compositions comprising at least one fluoroalkene containing from 3 to 4 carbon atoms and at least one carbon-carbon double bond. The fluoroalkene compounds of the present invention are sometimes referred to herein for the purpose of convenience as hydrofluoro-olefins or "HFOs." Although it is contemplated that the HFOs of the present invention may contain two carbon—carbon double bonds, such compounds at the present time are not considered to be preferred.

As mentioned above, the present compositions comprise one or compounds in accordance with Formula I. In preferred embodiments, the compositions include compounds of Formula II below:

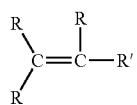

wherein each R is independently Cl, F, Br, I or H; R' is $(CR_2)_nY$; Y is $CRF_2$ and n is 0 or 1. In highly preferred embodiments, Y is $CF_3$, n is 0 and at least one of the remaining R's is F.

Applicant believes that, in general, the compounds of the above identified Formulas I and II are generally effective and exhibit utility in heat transfer applications in general and in compression refrigerant compositions in particular. However, it has been surprisingly and unexpectedly found that certain of the compounds having a structure in accordance with the formulas described above exhibit a highly desirable low level of toxicity compared to other of such compounds. As can be readily appreciated, this discovery is of potentially enormous advantage and benefit for the formulation of not only refrigerant compositions, but also any and all compositions which would otherwise contain relatively toxic compounds satisfying the formulas described above. More particularly, it is believed that a relatively low toxicity level is associated with compounds of Formula II, preferably wherein Y is $CF_3$, wherein at least one R on the unsaturated terminal carbon is H, and at least one of the remaining R's is F. It is believed also that all structural, geometric and stereoisomers of such compounds are effective and of beneficially low toxicity.

In highly preferred embodiments, especially embodiments which comprise the low toxicity compounds described above, n is zero. Thus, in certain preferred embodiments the compositions of the present invention comprise one or more compounds selected from the group consisting of trifluorpropene (HFC -1243), tetra-fluoropropenes (HFO-1234), pentafluoropropenes (HFO-1225) and combinations of these. The trans-1234 isomer has a boiling point of approximately −19° C. and the cis isomer has a boiling point of approximately +9° C. The trans isomer is particularly useful as a refrigerant and as an aersol propellent.

It is even more preferred that the compounds of the present invention are the tetrafluoroprpoene and pentafluoropropene compounds in which the unsaturated terminal carbon has not more than one F substituent, specifically: 1, 3, 3, 3-tetrafluoropropene (HFO-1234ze); 2, 3, 3, 3-tetrafluoropropene (HFO-1234yf); and 1,2,3,3,3-pentafluoropropene (HFO-1225ye), and any and all stereoisomers of each of these. It has been discovered that such compounds have a very acute low toxicity level, as measured by inhalation exposure to mice and rats. On the other hand, it has been found that a relatively high degree of toxicity may be associated with certain compounds adaptable for use with the present compositions, namely, those compounds which have more than one F on the terminal unsaturated carbon, or which do not have at least one H on the terminal unsaturated carbon. For example, it has been discovered that 1,1,3,3,3-pentafluoropropene (HFO-1225zc) exhibits an unacceptably high degree of toxicity, as measured by inhalation exposure to mice and rats.

The preferred compounds of the present invention, namely, HFO-1225 and HFO-1234 are known materials and are listed in Chemical Abstracts databases. HFO-1225 is commercially available, for example from Syntex Chemical Co. Futhermore, methods are described generally in the patent literature for producing fluoroalkenes. For example the production of fluoropropenes such as $CF_3CH=CH_2$ by catalytic vapor phase fluorination of various saturated and unsaturated halogen-containing $C_3$ compounds is described in U.S. Pat. Nos. 2,889,379; 4,798,818 and 4,465,786, each of which is incorporated herein by reference. U.S. Pat. No. 5,532,419, which is also incorpora-ted herein by reference, discloses a vapor phase catalytic process for the preparation of fluoroalkene using a chloro- or bromo-halofluorocarbon and H. EP 974,571, also incorporated herein by reference, discloses the preparation of 1,1,1,3-tetrafluoro-propene by contacting 1,1,1,3,3-pentafluoropropane (HFC-245fa) in the vapor phase with a chromium-based catalyst at elevated temperature, or in the liquid phase with an alcoholic solution of KOH, NaOH, Ca(OH)$_2$ or Mg(OH)$_2$. In addition, methods for producing compounds in accordance with the present invention are described generally in connection with concurrently filed United States Patent Application entitled "Process for Producing Fluorpropenes" bearing Ser. No. 10/694272, which is also incorporated herein by reference.

The present compositions are believed to possess properties that are advantageous for a number of important reasons. For example, applicants believe, based at least in part on mathematical modeling, that the fluoroolefins of the present invention will not have a substantial negative affect on atmospheric chemistry, being negligible contributors to ozone depletion in comparison to some other halogenated species. The preferred compositions of the present invention thus have the advantage of not contributing substantially to ozone depletion. The preferred compositions also do not contribute substantially to global warming compared to many of the hydrofluoroalkanes presently in use.

The flammability associated with any of a wide range of otherwise flammable fluids may be reduced according to the present invention. For example, the flammability associated with fluids such as ethylene oxide, flammable hydro fluorocarbons and hydrocarbons, including: HFC-152a, 1,1,1-trifluoroethane (HFC-143a), difluoromethane (HFC-32), propane, hexane, octane, and the like can be reduced according to the present invention. For the purposes of the present invention, a flammable fluid may be any fluid exhibiting flammability ranges in air as measured via any standard conventional test method, such as ASTM E-681, and the like.

Any suitable amounts of the present compounds or compositions may be added to reduce flammability of a fluid according to the present invention. As will be recognized by those of skill in the art, the amount added will depend, at least in part, on the degree to which the subject fluid is flammable and the degree to which it is desired to reduce the flammability thereof. In certain preferred embodiments, the amount of compound or composition added to the flammable fluid is effective to render the resulting fluid substantially non-flammable.

Although it is contemplated that the compositions of the present invention may include the compounds of the present invention in widely ranging amounts, it is generally preferred that refrigerant compositions of the present invention comprise compound(s) in accordance with Formula I, and even more preferably Formula II, in an amount that is at least about 50% by weight, and even more preferably at least about 70% by weight, of the composition. For preferred compositions for use as blowing agents in accordance with the present invention, compound(s) in accordance with Formula I, and even more preferably Formula II, are present in an amount that is at least about 5% by weight, and even more preferably at least about 15% by weight, of the composition.

The compositions of the present invention may include other components for the purpose of enhancing or providing certain functionality to the composition, or in some cases to reduce the cost of the composition. For example, refrigerant compositions according to the present invention, especially those used in vapor compression systems, include a lubricant, generally in amounts of from about 30 to about 50 percent by weight of the composition. Furthermore, the present compositions may also include a compatibilzer, such as propane, for the purpose of aiding compatibility and/or solubility of the lubricant. Such compatibilizers, including propane, butanes and pentanes, are preferably present in amounts of from about 0.5 to about 5 percent by weight of the composition. Combinations of surfactants and solubilizing agents may also be added to the present compositions to aid oil solubility, as disclosed by U.S. Pat. No. 6,516,837, the disclosure of which is incorporated by reference. Commonly used refrigeration lubricants such as Polyol Esters (POEs), Poly Alkylene Glycols (PAGs) and esterified Poly Alkylene Glycols that are used in refrigeration machinery with hydrofluorocarbon (HFC) refrigerants may be used with the refrigerant compositions of the present invention.

Methods and Systems

The compositions of the present invention are useful in connection with numerous methods and systems, including as heat transfer fluids in methods and systems for transferring heat, such as refrigerants used in refrigeration, air conditioning and heat pump systems.

The preferred heat transfer methods generally comprise providing a composition of the present invention and causing heat to be transferred to or from the composition by changing the phase of the composition. For example, the present methods provide cooling by absorbing heat from a fluid or article, preferably by condensing a refrigerant comprising the present compositions and thereafter evaporating the refrigerant in the vicinity of the body or fluid to be cooled. In many of such processes, the step of compressing the refrigerant vapor, usually with a rotary compressor or similar equipment, is also included as part of the refrigeration cycle. Such a step is then sometimes followed by an intermediate cooling step to remove at least a portion of the heat added to the refrigerant composition of the present invention by the compression step. This intermediate cooling step is then preferably followed by a nominally isoenthalpic reduction of the pressure of the cooled, high pressure refrigerant vapor to cause at least a portion of the vapor to condense to a relatively cold liquid phase. In such embodiments, it is this reduced temperature refrigerant liquid which is then vaporized by heat transferred from the body or fluid to be cooled.

In another process embodiment of the invention, the compositions of the invention may be used in a method for producing heating which comprises condensing a refrigerant comprising the compositions in the vicinity of a liquid or body to be heated and thereafter evaporating the refrigerant. Such methods, as mentioned hereinbefore, frequently are reverse cycles to the refrigeration cycle described above.

According to one aspect of the present invention, a method for producing refrigeration is provided by condensing a fluoroalkene containing from 2 to 5 carbon atoms and at least 1 but no more than 2 double bonds and thereafter evaporating the fluoroalkene in the vicinity of a body to be cooled. Fluoroalkenes containing 3 carbon atoms and 1 double bond are preferred.

Because heat pump systems are simply the reverse of refrigeration systems, according to another aspect of the present invention, a method is provided for producing heating by condensing a fluoroalkene containing from 2 to 5 carbon atoms and at least 1 but no more than 2 double bonds in the vicinity of a body to be heated and thereby evaporating the fluoroalkene. Again, fluoroalkenes containing 3 carbon atoms and 1 double bond are preferred.

It has also been discovered that the fluoroalkenes of the present invention are misicible with existing polyalkylene glycol, polyalkylene glycol ester and polyol ester lubricating oils. Therefore, according to another aspect of the present invention, a liquid composition is provided for use in compression refrigeration, air-conditioning and heat pump systems in which a fluoroalkene containing from 2 to 5 carbon atoms and at least 1 but no more than 2 double bonds is combined with a sufficient amount to provide lubrication of an essentially miscible organic lubricant selected from polyalkylene glycol, polyalkylene glycol ester and polyol ester lubricants for compression refrigeration, air-conditioning and heat pump systems. In certain preferred embodiments, the lubricants of this invention are organic compounds which are comprised of carbon, hydrogen and oxygen with a ratio of oxygen to carbon sufficient to provide a degree of miscibility with the fluoroalkene such the when about 1 to 5 weight percent of the lubricant is added to the refrigerant fluid the mixture has one liquid phase. Preferably, the mixture has one liquid phase when 1 to 20 weight percent of the lubricant is present in the mixture. Most preferably, the mixture is one liquid phase in all proportions of the components of mixture. This solubility or miscibility preferably exists at at least one temperature from about −40° C. and 70° C., and more preferably over essentially the entire temperature range.

As used herein the term "refrigeration system" refers to any system or apparatus, or any part or portion of such a system or apparatus, which employs a refrigeration liquid or refrigerant to provide cooling. Such refrigeration systems include, for example, air-conditioners, electric refrigerators, chillers, transport refrigeration systems, commercial refrigeration systems, and the like.

The present invention substitutes HFO's for HFC's, which, despite being safe for the ozone layer, are suspected of contributing to global warming. At least certain of the preferred HFO's according to the present invention have physical characteristics that allow for their substitution for HFC's with only a minimum of equipment changes.

The polyalkylene glycol lubricants suitable for use with the present invention typically containing from about 5 to 50 oxylakylene repeating units that contain from 1 to 5 carbon atoms. The polyalkylene glycol can be straight chain or branched and can be a homopolymer or co-polymer of 2, 3 or more oxyethylene, oxypropylene, oxybutylene or oxypentylene groups or combinations thereof in any proportions. Preferred polyalkylene glycols contain at least 50% oxypropylene groups. Compositions according to the present invention may contain one or more polyalkylene glycols as the lubricant, one or more polyalkylene glycol esters as the lubricant, one or more polyol esters as the lubricant, or a mixture of one of more polyalkylene glycols, one or more polyalkylene glycol esters and one or more polyol esters. Vinyl ethers are also useful in this invention.

Suitable polyalkylene glycols include the polyalkylene glycols of U.S. Pat. No. 4,971,712 and the polyalkylene glycol having hydroxy groups at each terminus disclosed by U.S. Pat. No. 4,755,316. The disclosures of both patents are incorporated herein by reference.

While suitable polyalkylene glycols include glycols terminating at each end with a hydroxyl group, other suitable HFO lubricants include polyalkylene glycols in which either or both terminal hydroxyl group is capped. The hydroxyl group may be capped with alkyl groups containing from 1 to 10 carbon atoms, 1 to 10 carbon atom alkyl groups containing heteroatoms such as nitrogen, the fluoroalkyl groups described by U.S. Pat. No. 4,975,212, the disclosure of which is incorporated herein by reference, and the like. When both polyalkylene glycol hydroxyl groups are end capped, the same type or a combination of two different types of terminal capping groups can be used.

Either or both hydroxyl groups can also be capped by forming the ester thereof with a carboxylic acid as disclosed by U.S. Pat. No. 5,008,028, the disclosure of which is also incorporated herein by reference. The lubricating oils of this patent are referred to as polyol esters and polyalkylene glycol esters. The carboxylic acid can also be fluorinated. When both ends of the polyalkylene glycol are capped, either or both ends may be capped with an ester, or one end may be capped with an ester and the other not capped or capped with one of the aforementioned alkyl, heteroalkyl or fluoroalkyl groups.

Commercially available polyalkylene glycol lubricants include Goodwrench Refrigeration Oil for HFC-134a systems from General Motors and MOPAR-56 from DaimlerChrysler, which is a polyalkylene glycol that is bis-capped by acetyl groups. Commercially available polyalkylene glycol esters include Mobil EAL 22 cc available from ExxonMobil and Solest 120 available from CPI Engineering Services, Inc. A wide variety of polyalkylene glycol lubricants are also available from Dow Chemical.

In preferred embodiments, the lubricants of this invention have viscosities of from about 1 to 1000 centistokes at about 37° C., more preferably in the range of from about 10 to about 200 centistokes at about 37° C. and even more preferably of from about 30 to about 150 centistokes.

In addition to the HFO refrigerant and lubricant, compositions according to the present invention can include other additives or materials of the type used in refrigeration, air-conditioning and heat pump compositions to enhance their performance. For example, the compositions can also include extreme pressure and anti-wear additives, oxidation and thermal stability improvers, pour and floc point depressants, anti-foaming agents, other lubricants soluble in HFO's, and the like. Examples of such additives are disclosed in U.S. Pat. No. 5,254,280, the disclosure of which is incorporated herein by reference. Compositions of the present invention can thus further include a quantity of mineral oil lubricant that would not otherwise be misicible or soluble with the HFO but is at least partially misicible or partially soluble when added to the HFO in combination with a polyalkylene glycol, polyalkylene glycol ester or polyol ester. Typically, this is a quantity up to about 5-20 weight %. A surfactant may also be added to compatibilize the mineral oil with the polyalkylene glycol, polyalkylene glycol ester or polyol ester and the HFO, as disclosed in U.S. Pat. No. 6,516,837, the disclosure of which is incorporated herein by reference.

Any of a wide range of methods for introducing the refrigeration compositions of the present invention to a compression refrigeration, air-conditioning or heat pump system can be used from the present invention. For example, one method comprises attaching a refrigerant container to the low-pressure side of a refrigeration system and turning on the refrigeration system compressor to pull the refrigeration composition into the system. In such embodiments, the refrigerant container may be placed on a scale such that the amount of refrigeration composition entering the system can be monitored. When a desired amount of refrigeration composition has been introduced into the system, charging is stopped. Alternatively, a wide range of charging tools, known to those skilled in the art, are commercially available. Accordingly, in light of the above disclosure, those of skill in the art will be readily able to introduce the HFO refrigerant and refrigeration compositions of the present invention into compression refrigeration, air-conditioning and heat pump systems without undue experimentation.

EXAMPLES

The following examples are provided for the purpose of illustrating the present invention but without limiting the scope thereof.

Examples 1

The coefficient of performance (COP) is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the volumetric efficiency of the refrigerant and provides some measure of the capability of a compressor to pump quantities of heat for a given volumetric flow rate of refrigerant. In other words, given a specific compressor, a refrigerant with a higher capacity will deliver more cooling or heating power. One means for estimating COP of a refrigerant at specific operating conditions is from the thermodynamic properties of the refrigerant using standard refrigeration cycle analysis techniques (see for example, R.C. Downing, FLUOROCARBON REFRIGERANTS HANDBOOK, Chapter 3, Prentice-Hall, 1988).

A refrigeration/air conditioning cycle system is provided where the condenser temperature is about 150° F. and the evaporator temperature is about −35° F. under nominally isentropic compression with a compressor inlet temperature of about 50° F. COP is determined for several compositions of the present invention over a range of condenser and evaporator temperatures and reported in Table 1 below, based upon HFC-134a having a COP value of 1.00, a capacity value of 1.00 and a discharge temperature of 175° F.

TABLE I

| REFRIGERANT COMPOSTION | Relative COP | Relative CAPACITY | DISCHARGE TEMPERATURE |
| --- | --- | --- | --- |
| HFO 1225ye | 1.02 | 0.76 | 158 |
| HFO trans-1234ze | 1.04 | 0.70 | 165 |
| HFO cis-1234ze | 1.13 | 0.36 | 155 |
| HFO 1234yf | 0.98 | 1.10 | 168 |

This example shows that certain of the preferred compounds for use with the present compositions each have a better energy efficiency than HFC-134a (1.02, 1.04 and 1.13 compared to 1.00) and the compressor using the present refrigerant compositions will produce discharge temperatures (158, 165 and 155 compared to 175), which is advantageous since such result will likely leading to reduced maintenance problems.

Example 2

The miscibility of HFO-1225ye and HFO-1234ze with various refrigeration lubricants is tested. The lubricants tested are mineral oil (C3), alkyl benzene (Zerol 150), ester oil (Mobil EAL 22 cc and Solest 120), polyalkylene glycol (PAG) oil (Goodwrench Refrigeration Oil for 134a systems), and a poly(alpha-olefin) oil (CP-6005-100). For each refrigerant/oil combination, three compositions are tested, namely 5, 20 and 50 weight percent of lubricant, with the balance of each being the compound of the present invention being tested.

The lubricant compositions are placed in heavy-walled glass tubes. The tubes are evacuated, the refrigerant compound in accordance with the present invention is added, and the tubes are then sealed. The tubes are then put into an air bath environmental chamber, the temperature of which is varied from about −50° C. to 70° C. At roughly 10° C. intervals, visual observations of the tube contents are made for the existence of one or more liquid phases. In a case where more than one liquid phase is observed, the mixture is reported to be immiscible. In a case where there is only one liquid phase observed, the mixture is reported to be miscible. In those cases where two liquid phases were observed, but with one of the liquid phases occupying only a very small volume, the mixture is reported to be partially miscible.

The polyalkylene glycol and ester oil lubricants were judged to be miscible in all tested proportions over the entire temperature range, except that for the HFO-1225ye mixtures with polyalkylene glycol, the refrigerant mixture was found to be immiscible over the temperature range of −50° C. to −30° C. and to be partially miscible over from −20 to 50° C. At 50 weight percent concentration of the PAG in refrigerant and at 60°, the refrigerant/PAG mixture was miscible. At 70° C., it was miscible from 5 weight percent lubricant in refrigerant to 50 weight percent lubricant in refrigerant.

Example 3

The compatibility of the refrigerant compounds and compositions of the present invention with PAG lubricating oils while in contact with metals used in refrigeration and air conditioning systems is tested at 350° C., representing conditions much more severe than are found in many refrigeration and air conditioning applications.

Aluminum, copper and steel coupons are added to heavy walled glass tubes. Two grams of oil are added to the tubes. The tubes are then evacuated and one gram of refrigerant is added. The tubes are put into an oven at 350° F. for one week and visual observations are made. At the end of the exposure period, the tubes are removed.

This procedure was done for the following combinations of oil and the compound of the present invention:
a) HFC-1234ze and GM Goodwrench PAG oil
b) HFC1243zf and GM Goodwrench oil PAG oil
c) HFC-1234ze and MOPAR-56 PAG oil
d) HFC-1243zf and MOPAR-56 PAG oil
e) HFC-1225 ye and MOPAR-56 PAG oil.

In all cases, there is minimal change in the appearance of the contents of the tube. This indicates that the refrigerant compounds and compositions of the present invention are stable in contact with aluminum, steel and copper found in refrigeration and air conditioning systems, and the types of lubricating oils that are likely to be included in such compositions or used with such compositions in these types of systems.

Comparative Example

Aluminum, copper and steel coupons are added to a heavy walled glass tube with mineral oil and CFC-12 and heated for one week at 350° C., as in Example 3. At the end of the exposure period, the tube is removed and visual observations are made. The liquid contents are observed to turn black, indicating there is severe decomposition of the contents of the tube.

CFC-12 and mineral oil have heretofore been the combination of choice in many refrigerant systems and methods. Thus, the refrigerant compounds and compositions of the present invention possess significantly better stability with many commonly used lubricating oils than the widely-used prior art refrigerant-lubricating oil combination.

What is claimed is:

1. A liquid composition for use in compression refrigeration, air-conditioning and/or heat pump systems consisting essentially of:
   (A) refrigerant consisting essentially of 1,3,3,3-tetrafluoropropene (HFO-1234ze), wherein said HFO-1234ze consists of trans-1,3,3,3-tetrafluoropropene (transHFO-1234ze); and
   (B) from about 1% up to about 50% by weight of polyol ester lubricant having a viscosity of from about 30 to about 200 centistokes at about 37° C., wherein said composition has substantially one liquid phase at least over the range of temperatures from about −50° C. to about +70° C. when measured at each of the lubricant concentrations of 5%, 20% and 50% by weight.

2. The composition of claim 1, wherein said composition has one liquid phase over at least the range of concentrations from about 5% to about 50% by weight.

3. The composition of claim 1 wherein said composition does not contribute substantially to global warming.

4. The composition of claim 1 wherein said composition does not contribute substantially to global warming compared to HFC-134a.

5. The composition of claim 1 wherein said composition is non-flammable.

6. A method for producing refrigeration in a refrigeration system comprising a compressor, an evaporator and a condenser, and a heat transfer composition consisting essentially of 1,3,3,3-tetrafluoropropene (HFO-1234ze), wherein said HFO-1234ze consists of trans-1,3,3,3-tetrafluoropropene (transHFO-1234ze), and from about 1% up to about 50% by weight of polyol ester lubricant having a viscosity of from about 30 to about 200 centistokes at about 37° C. contained in said system, said method comprising condensing in said condenser said transHFO-1234ze, and thereafter evaporating in said evaporator said transHFO-1234ze in the vicinity of a body to be cooled, wherein said body to be cooled comprises air and said refrigeration system is selected from the group consisting of air conditioners, electric refrigerators, chillers, transport refrigeration systems, and commercial refrigeration systems and wherein said heat transfer composition has substantially one liquid phase at least over the range of temperatures from about −50° C. to about and +70° C. when measured at each of the lubricant concentrations of 5%, 20% and 50% by weight.

7. The method of claim 6, wherein said system further comprises a condenser and said method further comprises condensing said refrigerant at a temperature that includes about 150° F.

8. The method of claim 7, wherein said refrigeration system comprises an air conditioning system.

9. The method of claim 6, wherein said refrigeration method is performed in an air-conditioning system.

10. The method of claim 6, wherein said lubricant is present in an amount effective to provide lubrication.

11. The method of claim 10, wherein the heat transfer composition has one liquid phase at least over said temperature range when measured at a lubricant concentration of over the range of from about 5 weight percent to about 20 weight.

12. The method of claim 10 wherein said refrigerant composition does not contribute substantially to global warming.

13. The method of claim 10 wherein said refrigerant composition does not contribute substantially to global warming compared to HFC-134a.

14. The method of claim 10 wherein said refrigerant composition is non-flammable.

15. A method for producing refrigeration in a refrigeration system comprising a compressor and an evaporator, said method comprising condensing a refrigerant composition consisting essentially of 1,3,3,3-tetrafluoropropene (HFO-1234ze), wherein said HFO-1234ze consists of trans-1,3,3,3-tetrafluoropropene (transHFO-1234ze), and from about 1% up to about 50% by weight of polyol ester lubricant having a viscosity of from about 30 to about 200 centistokes at about 37° C., and thereafter evaporating in said evaporator said refrigerant composition in the vicinity of a body to be cooled, wherein said refrigeration system comprises a chiller refrigeration systems, wherein said heat transfer composition has substantially one liquid phase at least over the range of temperatures from about −50° C. to about and +70° C. when measured at each of the lubricant concentrations of 5%, 20% and 50% by weight.

16. A refrigeration system comprising:
   (a) a refrigerant composition comprising (i) a refrigerant consisting essentially of 1,3,3,3-tetrafluoropropene (HFO-1234ze), wherein said HFO-1234ze consists of trans-1,3,3,3-tetrafluoropropene (transHFO-1234ze); and (ii) and from about 1% up to about 50% by weight of polyol ester lubricant having a viscosity of from about 30 to about 200 centistokes at about 37° C., wherein said heat transfer composition has one liquid phase at least over the range of temperatures from about −50° C. to about and +70° C. when measured at each of the lubricant concentrations of 5%, 20% and 50% by weight;
   (b) a compressor for compressing at least said transHFO-1234ze: and
   (c) a condenser for condensing at least said transHFO-1234ze.

* * * * *